Figure 1:
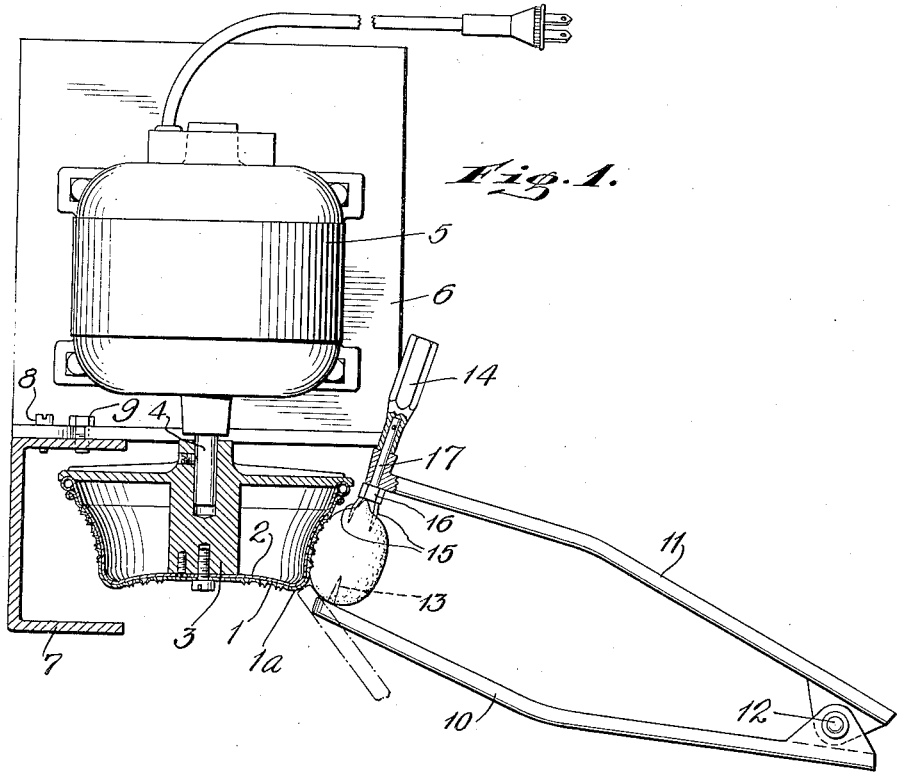

Nov. 10, 1936.                    W. ZOELLER                    2,060,272
                         PEEL REMOVING AND GRATING MACHINE
                              Filed Jan. 11, 1936

INVENTOR:
William Zoeller,
BY
Lewis J. Doolittle,
ATTORNEY.

Patented Nov. 10, 1936

2,060,272

UNITED STATES PATENT OFFICE 2,060,272

PEEL REMOVING AND GRATING MACHINE

William Zoeller, Brooklyn, N. Y.

Application January 11, 1936, Serial No. 58,658

3 Claims. (Cl. 146—177)

This invention relates to a peel removing and grating machine adapted for use in removing and simultaneously grating the peel or natural coating of certain fruits, particularly citrus fruits such as lemons, oranges, etc. This operation is preferably performed before squeezing the fruit and removing the juice therefrom. The grated peel is used for many purposes, in the culinary art, etc.
The object of the invention is to provide a machine or device with which the peel, skin or rind of the fruit may be quickly and uniformly removed and grated into fine particles at the same time.
In carrying out the object of my invention, I provide a cup-shaped grating member provided with a circular wall and a bottom portions, both of which are preferably concaved in form and provided with a roughened grating surface. The cup-shaped form is outwardly tapered from the bottom portion and at the juncture of the side and bottom portions a smooth surfaced portion is provided which separates the grating surfaces on the said side and bottom portions. A backing member, which is correspondingly shaped is provided and upon which the grating member is snugly mounted. This backing member is mounted upon a rotatable member which is carried by and rotated by means of a motor shaft driven by a suitable motor. A guard member is mounted and positioned over the rotatable grating member and a holder for the fruit is provided which is adapted to carry the same and by means of which the fruit is brought into contact with the grating surfaces and rotated by hand, preferably in the opposite direction from the direction of rotation of the grating member.

In the drawing I have shown an illustrative embodiment of my invention in a machine of the class described. In the drawing like parts in the several views have been given the same reference numeral.

Figure 2:
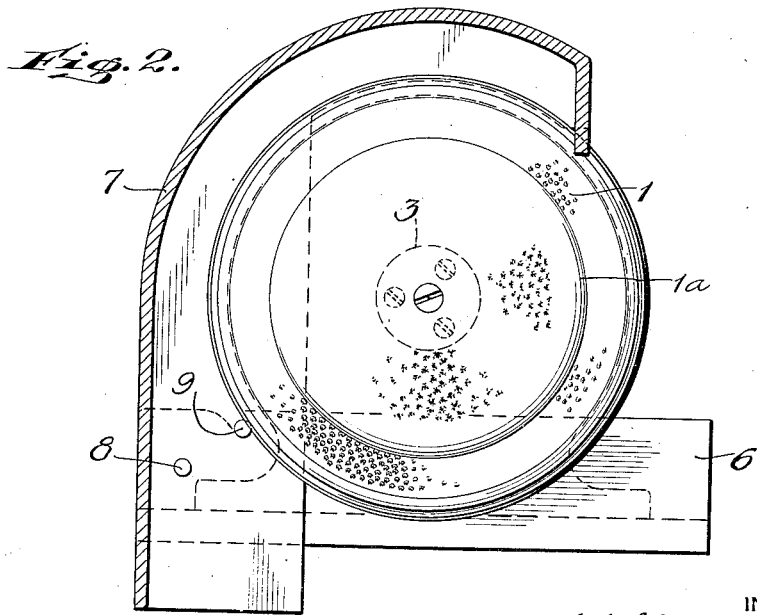

Fig. 1 is a top or plan view, partly in section, of a machine embodying my invention; Fig. 2 is an end view or elevation, also partly in section, of the machine shown in Fig. 1.

The grating member such as described is shown at 1 and is mounted upon a backing member or support 2 upon which it snugly fits. This backing member 2 also prevents the particles of the grated peel from passing through the grating member at the openings made by punching out the roughened grating portions. The grating member 1 is formed with outwardly flaring circular side wall and a bottom portion, both of which are concaved in form and provided with a roughened grating surfaces except at the portion where the bottom portion and side wall join, at which point the surface is left smooth, as shown at 1a, the purpose of which will be explained hereinafter. The support or backing member 2 is mounted upon a rotatable member 3, being secured thereto by screws or other suitable means, and the rotatable member 3 is mounted at the end of a motor driven shaft 4, driven by a suitable motor 5, which may be mounted upon a support such as shown at 6.

A guard 7 is pivotally mounted upon the support 6 by means of a hinge or pivot 8 and a stop 8 is also provided to limit the movement of the same to the position shown, extending over the grating member 1.

A fruit holder is formed by two hinged arms, 10 and 11, hinged at one end as shown at 12. A pointed pin 13 is carried at the opposite end of one of the arms, 10, and a handle 14 is rotatably mounted at the corresponding end of the other arm, 11, which handle rotates a pair of pins 15 mounted on a head 16 carried at one end of the shaft 17, at the outer end of which the handle 14 is attached, as shown in Fig. 1.

The fruit is impinged upon and rotatably held by the pins 13 and 15, heretofore described, and brought against the grating surfaces of the member 1.

A pan or other suitable receptacle, not shown in the drawing, may be placed under the rotatable grating member 1. The guard 7 extending over and partly around the grating member, as shown in Fig. 2, prevents the grated peel from flying off and away from the machine and directs the same into the pan placed under the same. The grating member is preferably rotated in a clock-wise direction, as viewed from the end shown in Fig. 2 and the fruit carried by the fruit holder, 10—11, is constantly rotated in the opposite direction by means of the handle 14. The fruit is brought against the grating surfaces on both the circular wall and bottom portion and thus practically every part of the peel removed and grated, as will be understood by reference to the drawing. The concave shape of the grating surfaces enable the same to be contacted by a longer portion of the fruit skin or peel, resulting in a very even and uniform product being produced. The smooth portion, 1a, between the grating surfaces of the circular side wall and bottom portion provides a rest or support against which the end of the holder arm 10 may be lightly rested, assisting the operator in holding the fruit steady against the grating surface.

This smooth portion, 1a, also acts as a guide for the proper positioning of the holder and fruit carried thereon with relation to the grating surface, both when the arm 10 of the holder is in contact therewith, indicated in dotted outline in Fig. 1, or out of contact but opposite this surface, as shown in full lines in Fig. 1. This feature also prevents injury either to the holder or grating surface which would result if the metal parts were brought into contact, as will be understood.

What I claim as new and desire to secure by Letters Patent is:—

1. In a device of the class described, the combination of a cup-shaped grating member provided with a circular wall and bottom portions both of which are concave in form and provided with roughened grating surfaces and formed with a smooth surface extending around the circumference of the side wall and bottom portions and separating the grating surfaces thereof, a backing member corresponding in shape with said grating member and upon which said grating member is snugly mounted, a rotating member to which said backing member is attached, a shaft upon which said rotating member is mounted, a motor for driving said shaft, a support upon which said motor is mounted, a guard pivotally mounted upon said support and normally positioned over said grating member, a holder for the fruit comprising a pair of hinged arms, a rotatable handle carried by one of said arms, a head, pins carried by said head offset on opposite sides of the axis of said shaft upon which said head is mounted, and a pin carried by the other of said arms co-axially with said shaft, the fruit being impinged upon said pins and adapted to be rotated in engagement with said grating surfaces.

2. In a device of the class described, the combination of a grating member having an outwardly flaring circular side wall and a bottom portion both of which are provided with roughened grating surfaces which grating surfaces are separated by a smooth surface portion extending around the circumference of the side wall and bottom portion and separating the grating surfaces thereof, a backing member corresponding in shape with said grating member and upon which it is mounted, a rotatable member to which said backing member is attached, a shaft upon which said rotatable member is attached at one end, a motor to which the opposite end of said shaft is attached, and a guard positioned over said grating member.

3. In a device of the class described, the combination of a grating member having outwardly flared side walls of circular shape and a bottom portion both of which are provided with roughened grating surfaces, said grating surfaces being separated by a smooth surface portion extending around the circumference of the bottom portion at the junction of the same with the side wall and separating the grating surfaces of said portions, a backing member corresponding in shape with said grating member and upon which said grating member is snugly mounted and rotated thereby, a rotatable member upon one end of which said backing member is attached, a shaft upon which said rotatable member is mounted at one end, a motor to which the opposite end of said shaft is attached and driven, a support upon which said motor is mounted, a guard mounted upon said support and normally positioned over said grating member, a holder for the fruit comprising a pair of hinged arms, a shaft carried by one of said arms, a handle attached to the outer end of said shaft, a head attached to the inner end of said shaft, a pair of pins carried by said head offset from the axial line thereof, and a pin carried by the other of said arms in axial alinement with the said shaft and extending inwardly in opposed position to said first named pins carried by said head, the fruit being impinged upon and rotatably carried by said pins and brought into engagement with the grating surfaces of said grating member and simultaneously rotated by means of the handle at the outer end of said shaft carried by one of the arms of said holder to simultaneously remove and grate the peel from the fruit.

WILLIAM ZOELLER.